June 26, 1923.

K. ALQUIST

GEARING

Filed April 5, 1919

1,459,964

Inventor:
Karl Alquist,
by Albert G. Davis
His Attorney.

Patented June 26, 1923.

1,459,964

UNITED STATES PATENT OFFICE.

KARL ALQUIST, OF NEW YORK, N. Y.

GEARING.

Application filed April 5, 1919. Serial No. 287,859.

*To all whom it may concern:*

Be it known that I, KARL ALQUIST, a subject of the King of Sweden, residing at New York, in the county of New York, State of New York, have invented certain new and useful Improvements in Gearings, of which the following is a specification.

In my application Serial No. 210,955 filed January 9, 1918, I have disclosed and claimed a gearing wherein the two parts or halves of a high speed double helical pinion are formed separately from each other and connected together in such manner that they can adjust themselves relatively to each other to take care of inequalities in the bearing alignments and in the tooth structures, and the object of my present invention is to provide an improved pinion structure of this type and improved gearing arrangements to which it is well adapted.

For a consideration of what I believe to be novel and my invention, attention is directed to the accompanying description and the claims appended thereto.

Figure 1:
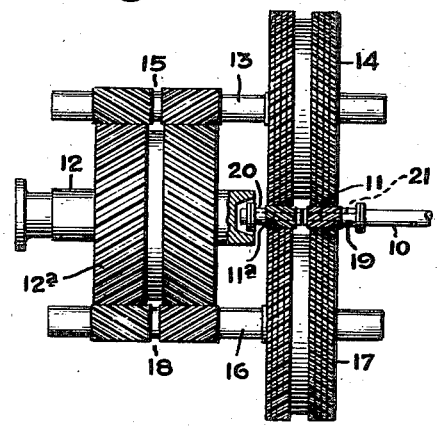
Figure 3:
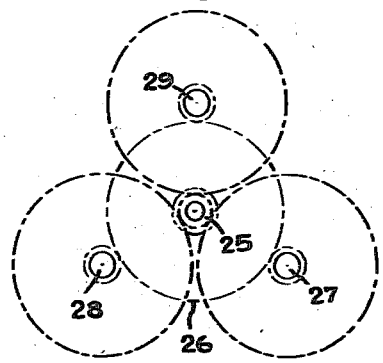
Figure 2:
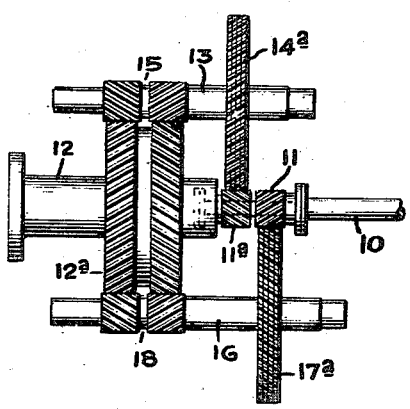
Figure 4:
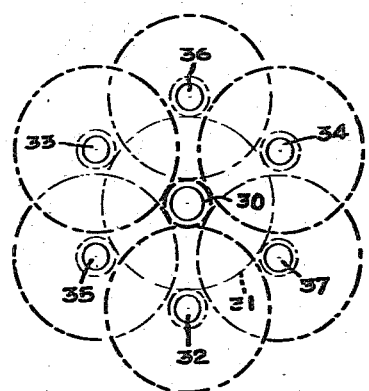

In the drawing, Fig. 1 shows a gearing structure embodying my invention and may be considered as being either a plan view or a side elevation; Fig. 2 is a view similar to Fig. 1 of another structure embodying my invention; Figs. 3 and 4 are diagrammatic end views of other arrangements of gearing embodying my invention; and Fig. 5 is a longitudinal sectional view of my improved pinion structure.

Referring to Fig. 1, 10 indicates a high speed shaft having thereon a high speed pinion comprising two halves or parts 11 and 11$^a$ one of which has right hand helical teeth and the other left hand helical teeth, and 12 indicates a low speed shaft having thereon the low speed gear wheel 12$^a$. Power is transmitted from the high speed pinion to the low speed gear wheel through two sets of intermediate speed shafts having gear wheels thereon which transmit the load in parallel. 13 indicates one of the intermediate speed shafts carrying a high speed gear wheel 14 which meshes with the high speed pinion and a low speed pinion 15 which meshes with the low speed gear wheel. 16 indicates the other of the intermediate speed shafts carrying a high speed gear wheel 17 which meshes with the high speed pinion and a low speed pinion 18 which meshes with the low speed gear wheel. The high speed end of the gearing i. e., the high speed pinion 11, 11$^a$ and gear wheels 14 and 17, is of the double helical or herringbone type of gearing and the gear wheels 14 and 17 are preferably of the flexible type invented by me and comprising a number of plates, discs, or laminae fixed together at their central portions and slightly spaced apart at their peripheries so they may flex laterally under excessive tooth pressure. The low speed end of the gearing may have either straight or helical teeth but preferably it is of the double helical type.

Figure 5:
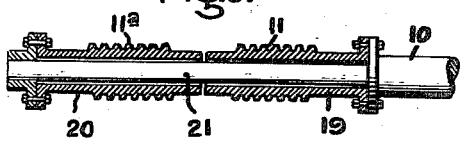

Now, according to my invention I form the two pinion halves or parts 11 and 11$^a$ on quill shafts 19 and 20 and extending through these quill shafts is a connecting shaft 21 which at its two ends is connected to the outside ends of quill shafts 19 and 20 as shown in Fig. 5. Connecting shaft 21 may be an independent shaft connected to high speed shaft 10 by a suitable coupling or it may be formed integral with shaft 10 as shown. Connecting shaft 21 is of such dimensions that it is capable of appreciable torsion and bending.

I have not illustrated the bearings for the various shafts as suitable bearings such as may be found desirable may be provided. In the case of pinion parts 11 and 11$^a$ I preferably provide a bearing at each end of each part and such bearings will be slightly oversize or suitably arranged to yield so as to permit sideway movements of the pinion parts both together and also relatively to each other. It will also be understood that the usual clearances are provided between the gear wheel and pinion ends and the bearings to permit of axial adjustments of the shafts.

The connecting together of the two pinion parts 11 and 11$^a$ by means of shaft 21 which is capable of appreciable torsion and bending together with the arrangement which permits axial movement of the high speed pinion as a whole and independent sideway movement of the two pinion parts relatively to each other makes it possible for the pinion to equalize any errors of the wheels in mesh as long as they are not too large.

By way of illustration, if, for instance, there were a bump or high place on the left hand half of gear wheel 14, passing in mesh while the left hand half of gear wheel 17 were running true, the pinion part 11$^a$ would have to be shifted out of the plane of the paper, so to speak, in order to keep the surface contact. The result would be a change in the torsional stresses in the interior connecting shaft 21 and the momentary increase in the drive of pinion part 11ª over pinion part 11 would be equalized by the usual end sliding of the high speed pinion as a whole. If at the same time a bump or high place on the left hand half of gear wheel 17 were passing in mesh, a similar bump or high place on the right hand half were also passing in mesh, then there would be no end movement as is obvious. If the errors in the left hand and right hand halves of gear wheel 17 were equal and opposite, the pinion parts 11 and 11ª would have to move out of the plane of the paper in opposite directions, and the connecting shaft 21, would have to twist and bend more. In any event with the arrangement shown adjustments can always take place which will insure even meshing and equal division of the load.

In Fig. 2 I have shown my improved pinion structure in connection with a gearing arrangement as disclosed and claimed in my application Serial No. 203,064, filed November 20, 1917. It differs from the arrangement shown in Fig. 1 in that the high speed gear wheels designated 14ª and 17ª are each of the single helical type and mesh, one meshing with pinion part 11 and the other with pinion part 11ª. Otherwise the structure is the same as that of Fig. 1 and the same reference numerals are accordingly applied to the corresponding parts.

In Fig. 3, I have indicated an arrangement similar to Fig. 1 except that the drive between the high speed pinion and the low speed gear wheel is through three intermediate speed shafts arranged 120° apart. 25 indicates the high speed pinion, 26 the low speed gear wheel, and 27, 28 and 29 the three intermediate speed shafts, carrying gear wheel and pinions which mesh with the high speed pinion and low speed gear wheel respectively. With this arrangement bearings for the high speed pinion parts would not be required as the position of the pinion parts would be definitely determined by the gear wheels in mesh therewith.

In Fig. 4 I have indicated an arrangement similar to that of Fig. 2 except that each pinion part 11 and 11ª transmits power to the low speed shaft through three intermediate speed shafts, thus making six such shafts in all. In Fig. 4, 30 indicates the high speed pinion, 31 the low speed gear wheel, 32, 33 and 34 intermediate speed shafts which transmit power from one half of pinion 30 to gear wheel 31 and 35, 36 and 37 intermediate speed shafts which transmit power from the other half of pinion 30 to gear wheel 31.

In accordance with the provisions of the patent statutes, I have described the principle of operation of my invention, together with the apparatus which I now consider to represent the best embodiment thereof, but I desire to have it understood that the apparatus shown is only illustrative and can be carried out by other means.

I claim—

1. In a gearing, a high speed pinion comprising a right hand helical pinion member and a left hand pinion member, separate quill shafts for said pinion members, a length of shaft extending through said quill shafts and connected at spaced points thereto whereby the pinion members can adjust themselves relatively to each other, a low speed gear wheel means, and intermediate speed gear wheel means for transmitting power between said pinion members and said low speed gear wheel means.

2. In a gearing, a high speed pinion comprising a right hand helical pinion member and a left hand helical pinion member, separate quill shafts for said pinion members, a length of shaft extending through said quill shafts and connected at spaced points thereto whereby the pinion members can adjust themselves relatively to each other, a low speed gear wheel means, and a plurality of intermediate speed shafts having gear wheel means thereon for transmitting power between said pinion members and said low speed gear wheel means.

3. In a gearing, a high speed pinion comprising a right hand helical pinion member and a left hand helical pinion member, separate quill shafts for said pinion members, a length of shaft extending through said quill shafts and connected at spaced points thereto whereby the pinion members can adjust themselves relatively to each other, a low speed gear wheel means, and a plurality of intermediate speed shafts having gear wheel means thereon for transmitting power between said pinion members and said low speed gear wheel means, some of said intermediate speed shafts transmitting power from one of said pinion members only and others transmitting power from the other of said pinion members only.

4. In a gearing, a high speed pinion comprising a right hand helical pinion member and a left hand helical pinion member, separate quill shafts for said pinion members, a length of shaft which extends through said quill shafts and is connected to the outer ends of the quill shafts whereby the pinion members can adjust themselves relatively to each other, a low speed gear wheel means, and intermediate speed shafts located on diametrically opposite sides of said pinion members and having gear wheel means thereon which transmit the load in parallel between the pinion members and said gear wheel means.

5. In a gearing, a high speed pinion comprising a right hand helical pinion member and a left hand helical pinion member, separate quill shafts for said pinion members, a length of shaft extending through said quill shafts and connected at spaced points thereto whereby the pinion members can adjust themselves relatively to each other, a low speed gear wheel means, and intermediate speed shafts located on diametrically opposite sides of said pinion members and having gear wheel means thereon which transmit the load in parallel between the pinion members and said gear wheel means, one of said intermediate speed shafts transmitting power from one of said pinion members only, and another transmitting power from the other of said pinion members only.

In witness whereof, I have hereunto set my hand this 4th day of April, 1919.

KARL ALQUIST.